United States Patent
Lee et al.

(10) Patent No.: US 10,267,986 B2
(45) Date of Patent: Apr. 23, 2019

(54) OPTICAL FIBER PLATE MANUFACTURING APPARATUS AND METHOD USING VIBRATION

(71) Applicant: TOVIS CO., LTD., Incheon (KR)

(72) Inventors: Kyung Ha Lee, Changwon-si (KR); In Soo Jeon, Busan (KR); Young Tae Jeong, Seoul (KR); In Suk Lee, Seoul (KR); Seung Hwan Hang, Yongin-si (KR); Jae Min Kim, Seongnam-si (KR); Gi Yun Eom, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 15/770,758

(22) PCT Filed: Oct. 28, 2016

(86) PCT No.: PCT/KR2016/012279
§ 371 (c)(1),
(2) Date: Apr. 25, 2018

(87) PCT Pub. No.: WO2017/074113
PCT Pub. Date: May 4, 2017

(65) Prior Publication Data
US 2018/0321441 A1 Nov. 8, 2018

(30) Foreign Application Priority Data
Oct. 26, 2015 (KR) .................. 10-2015-0148872

(51) Int. Cl.
*G02B 6/08* (2006.01)
*G02B 6/25* (2006.01)
(Continued)

(52) U.S. Cl.
CPC ............ *G02B 6/08* (2013.01); *G02B 6/25* (2013.01); *G02B 6/255* (2013.01); *G02B 6/0065* (2013.01)

(58) Field of Classification Search
CPC . G02B 6/08; G02B 6/25; G02B 6/255; G02B 6/0065
See application file for complete search history.

(56) References Cited

U.S. PATENT DOCUMENTS 2,992,956 A * 7/1961 Bazinet, Jr. ............ C03B 37/15
156/296
2006/0133751 A1 6/2006 Chen et al.

FOREIGN PATENT DOCUMENTS

JP 10-330133 A 12/1998
JP 2000-159535 A 6/2000
(Continued)

OTHER PUBLICATIONS

International Search Report for PCT/KR2016/012279 dated Jan. 10, 2017 from Korean Intellectual Property Office.

*Primary Examiner* — Ryan A Lepisto
(74) *Attorney, Agent, or Firm* — Revolution IP, PLLC

(57) ABSTRACT

An optical fiber plate manufacturing apparatus using vibration, includes: an optical fiber supply unit configured to supply an optical fiber; an optical fiber cutting unit configured to cut the optical fiber, supplied from the optical fiber supply unit, to a preset size; an optical fiber storage case configured to collect and store optical fibers, cut to the preset size, in a predetermined direction; and an optical fiber arranging unit configured to arrange the optical fibers, stored in the optical fiber storage case, using vibration so as to minimize a gap between the optical fibers.

11 Claims, 6 Drawing Sheets

(51) Int. Cl.
*G02B 6/255* (2006.01)
*F21V 8/00* (2006.01)

(56) References Cited

FOREIGN PATENT DOCUMENTS

| JP | 3089449 B2 | | 9/2000 | | |
|---|---|---|---|---|---|
| JP | 2005-162518 A | | 6/2005 | | |
| JP | 2005225749 A | * | 8/2005 | ......... | C03B 37/0126 |
| KR | 10-2006-0109672 A | | 10/2006 | | |

* cited by examiner

[FIG.1]
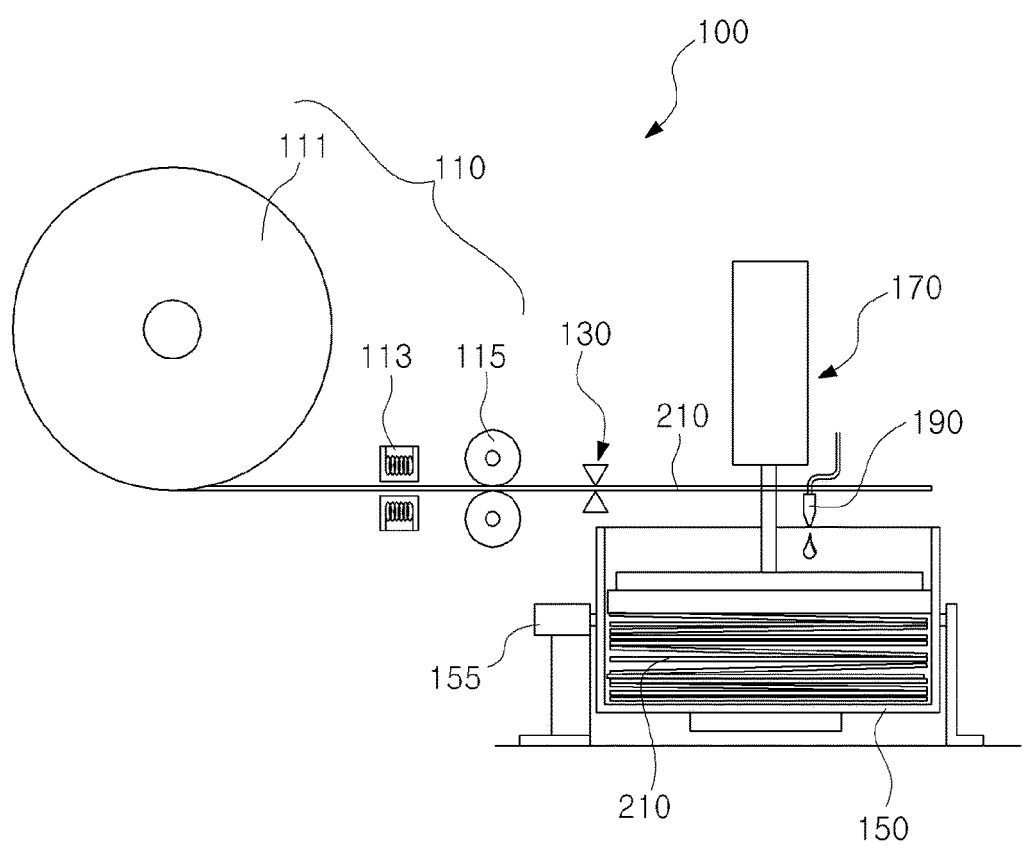

[FIG.2]
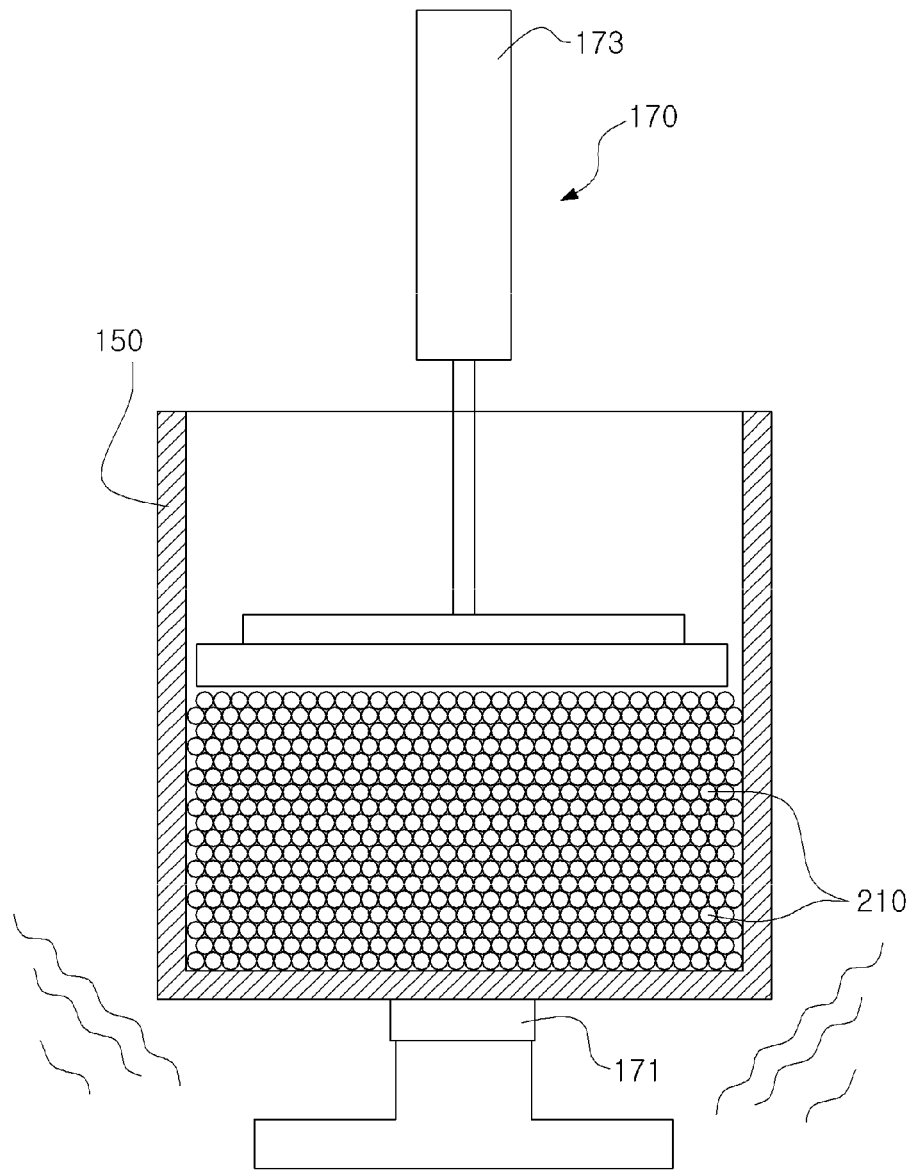

[FIG.3]
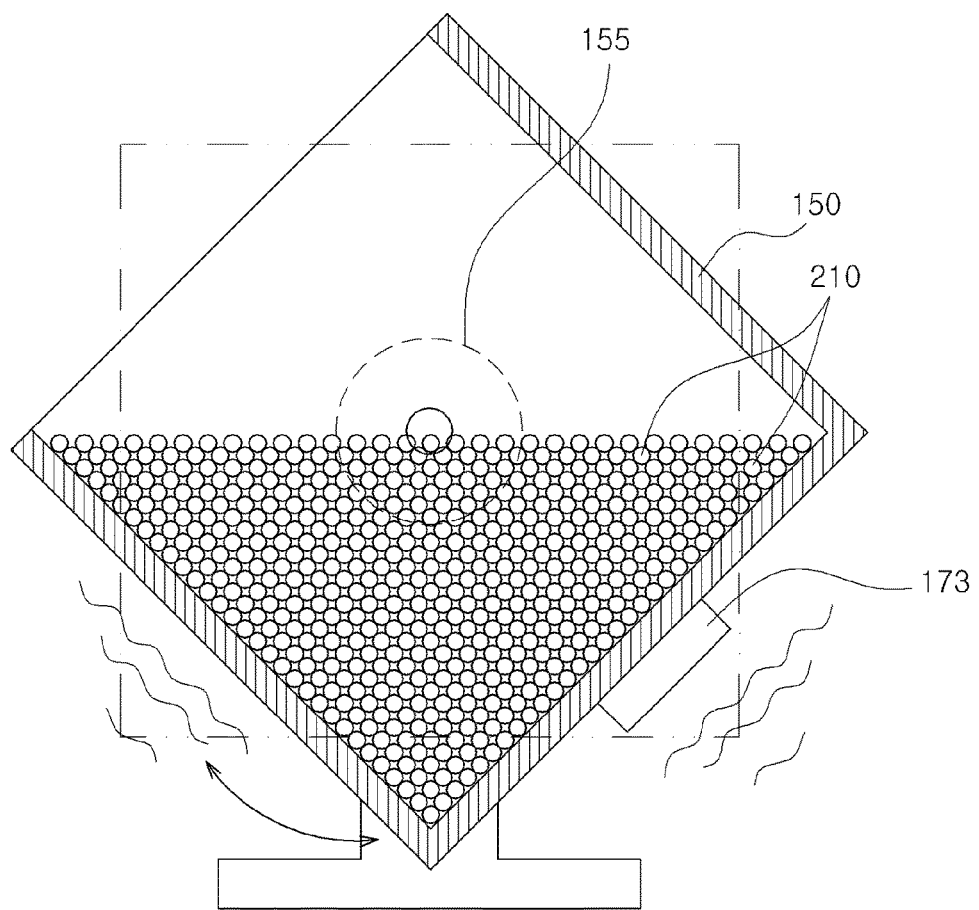

[FIG.4]
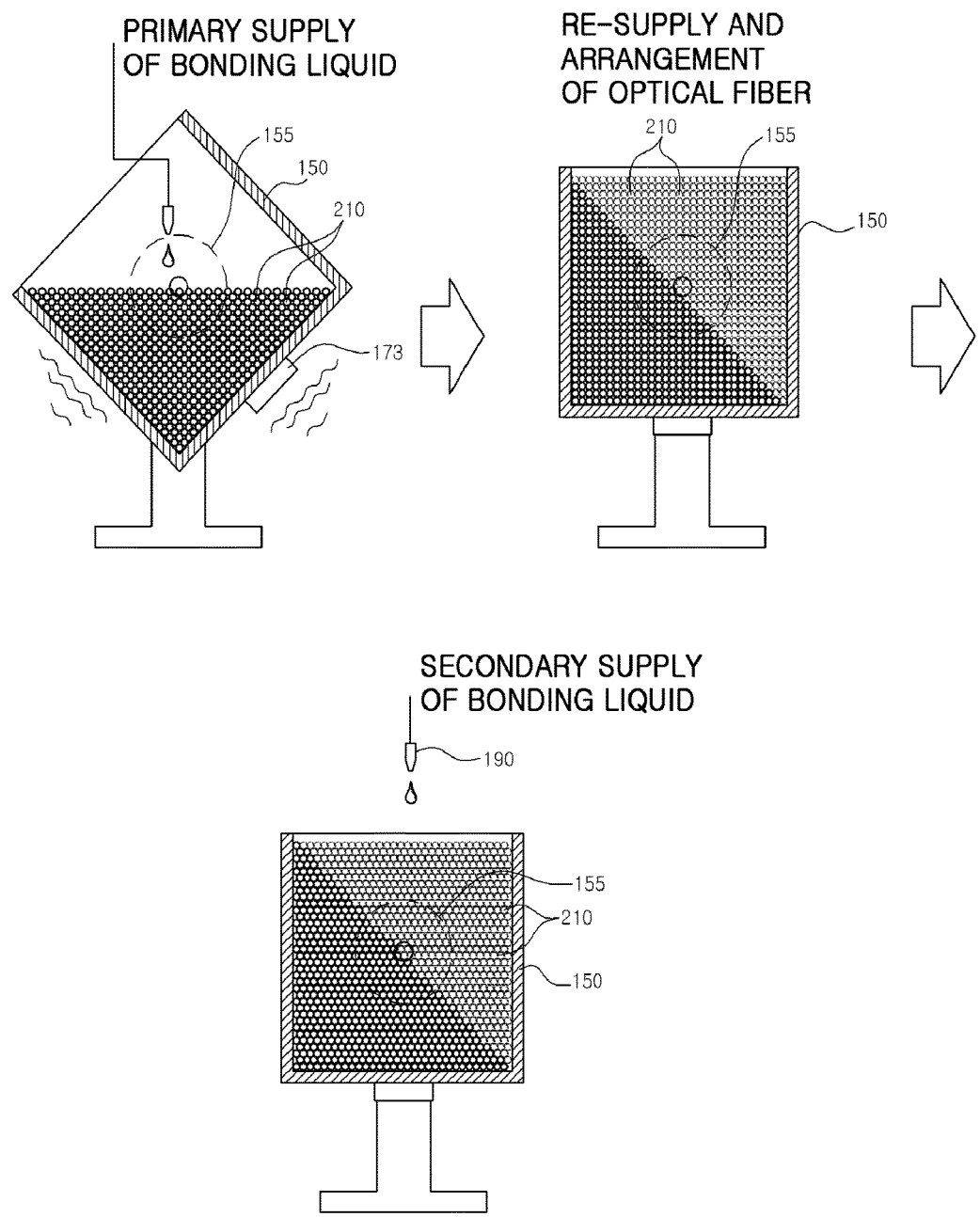

[FIG.5]
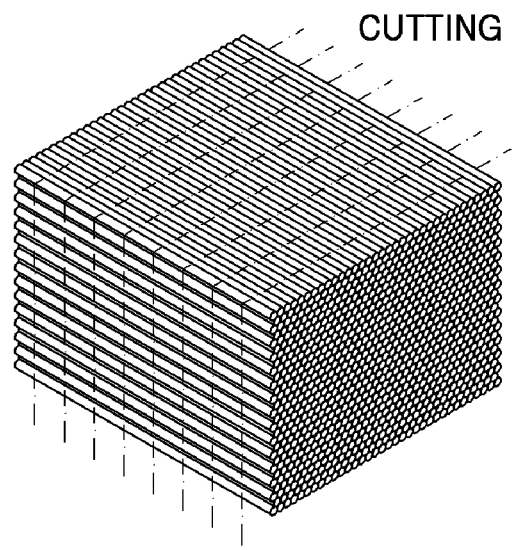
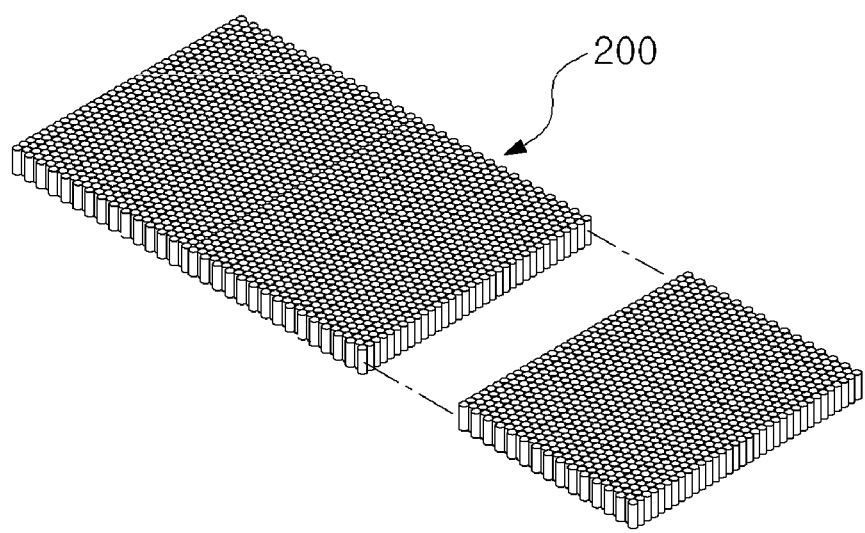

[FIG.6]
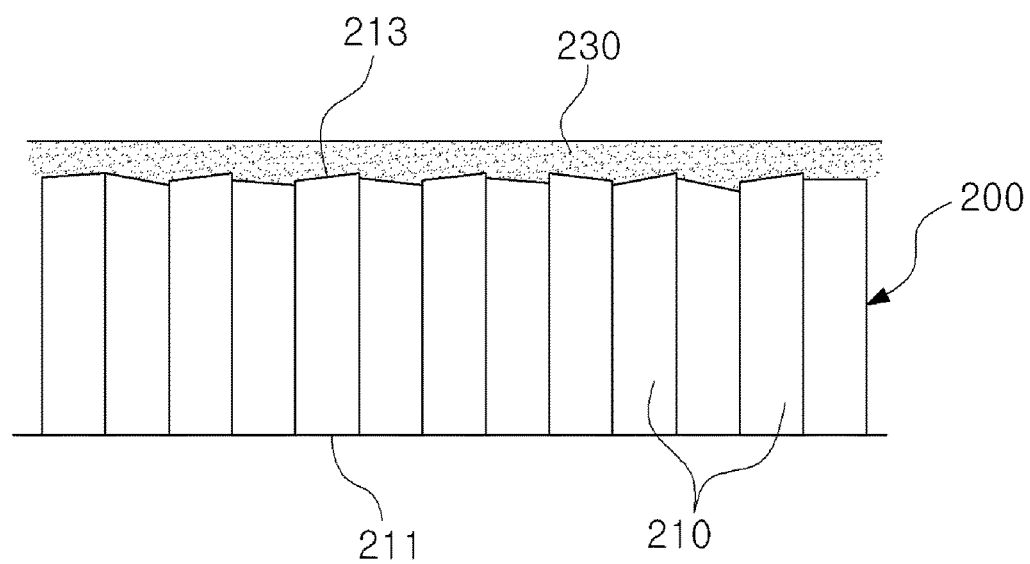

OPTICAL FIBER PLATE MANUFACTURING APPARATUS AND METHOD USING VIBRATION

TECHNICAL FIELD

The present invention relates to an optical fiber plate manufacturing apparatus and an optical fiber plate manufacturing method for manufacturing an optical fiber plate having optical fibers collected together to transmit an image.

BACKGROUND ART

In general, an optical fiber is a cable that transmits light, and utilization thereof is increasing as optical technologies develop.

As an example of such use of optical fiber, Korean Patent Laid-Open Publication No. 10-2006-0109672 (published on 23 Oct. 2006) discloses "DISPLAY ENLARGING APPARATUS AND MANUFACTURING METHOD THEREOF".

Conventionally, a display enlarging apparatus has been manufactured by a method including a step of making a light-transmitting bundle using light-transmitting media, which transmit light incident on an input end to an output end thereof, so as to be larger than a screen of a display device and to have a cross-sectional shape corresponding to that of the screen, and a step of press-forming the light-transmitting bundle, made in the step of making the light-transmitting bundle, so that the cross section thereof on at least one press point in the longitudinal direction thereof has a size corresponding to the screen of the display device.

In the display enlarging apparatus manufactured by the method described above, the light exit surface of the light-transmitting bundle is larger than the light entrance surface thereof to enable display of an enlarged image.

However, the conventional method of manufacturing the display enlarging apparatus causes optical fibers to be irregularly arranged because they are collected to form the light-transmitting bundle without being aligned with each other. Therefore, it is difficult to obtain a vivid image due to distortion of the image at the light exit surface.

DISCLOSURE

Technical Problem

Therefore, the present invention has been made in view of the above problem, and it is an object of the present invention to provide an optical fiber plate manufacturing apparatus and an optical fiber plate manufacturing method using vibration, which may ensure easy manufacture and may minimize the distortion of light, thereby enabling transmission of light having uniform quality.

Technical Solution

In accordance with the present invention, the above and other objects can be accomplished by the provision of an optical fiber plate manufacturing apparatus using vibration including an optical fiber supply unit configured to supply an optical fiber, an optical fiber cutting unit configured to cut the optical fiber, supplied from the optical fiber supply unit, to a preset size, an optical fiber storage case configured to collect and store optical fibers, cut to the preset size, in a predetermined direction, and an optical fiber arranging unit configured to arrange the optical fibers, stored in the optical fiber storage case, using vibration so as to minimize a gap between the optical fibers.

The optical fiber supply unit may include a supply roll configured to wind the optical fiber therearound and supply the optical fiber, and a heating unit configured to heat the optical fiber, wound around and supplied from the supply roll, so as to be straightened.

The optical fiber plate manufacturing apparatus may further include a supply forming roller configured to guide the optical fiber, heated by the heating unit, to the optical fiber cutting unit and to pull and straighten the optical fiber.

The optical fiber arranging unit may include a vibrating mechanism configured to vibrate and arrange the optical fibers stored in the optical fiber storage case, or a pressing mechanism configured to press and arrange the optical fibers stored in the optical fiber storage case.

The optical fiber storage case may have a rectangular box shape, and may include a case rotating mechanism configured to rotate the optical fiber storage case such that one side, among opposite sides of a lower end thereof, corresponding to a longitudinal direction of the optical fibers stored in the optical fiber storage case is located at a lowermost position.

The optical fiber plate manufacturing may further include a bonding liquid supply unit configured to supply a bonding liquid to the optical fiber storage case so that the optical fibers stored in the optical fiber storage case are attached to each other.

In accordance with another aspect of the present invention, there is provided an optical fiber plate manufacturing method including cutting an optical fiber to a preset size, collecting and storing cut optical fibers in a predetermined direction in an optical fiber storage case, arranging the optical fibers, stored in the optical fiber storage case, by applying vibration to the optical fibers, and supplying a bonding liquid to the arranged optical fibers and curing the bonding liquid.

The arranging may include arranging the optical fibers using vibration or by pressing the optical fibers.

The arranging may include rotating the optical fiber storage case such that one side, among opposite sides of a lower end thereof, corresponding to a longitudinal direction of the optical fibers stored in the optical fiber storage case is located at a lowermost position in a state in which only a portion of the optical fiber storage case is filled with the optical fibers.

The supplying may include primarily supplying the bonding liquid so that the optical fibers, stored in the optical fiber storage case, are attached to each other, after the rotating, filling a remaining portion of the optical fiber storage case with the optical fibers by rotating the optical fiber storage case to an initial state thereof when the primarily supplied bonding liquid is cured, and secondarily supplying the bonding liquid so that the optical fibers, stored in the remaining portion of the optical fiber storage case, are attached to each other.

The optical fiber plate manufacturing method may further include, after the supplying, cutting the bonded optical fibers in the optical fiber storage case, or bonding a plurality of optical fibers to each other so as to form the optical fibers having a preset shape.

The optical fiber plate manufacturing may further include, after the supplying, polishing a light exit surface of the optical fiber, or forming an even surface layer on the light exit surface, so as to diffuse and discharge light from the light exit surface.

Advantageous Effects

According to the present invention, an optical fiber plate is manufactured by uniformly arranging optical fibers via vibration. Thereby, it is possible to uniformly transmit light throughout the optical fiber plate and to easily manufacture the optical fiber plate.

In addition, by polishing the light exit surface of the optical fiber plate or by forming an even surface layer thereon, it is possible to enlarge the viewing angle of an image to be discharged.

DESCRIPTION OF DRAWINGS

FIG. 1 is a schematic view illustrating the configuration of an optical fiber plate manufacturing apparatus using vibration according to an embodiment of the present invention.

FIG. 2 is a view illustrating the rotating state of an optical fiber storage case constituting the optical fiber plate manufacturing apparatus using vibration according to the embodiment of the present invention.

FIG. 3 is a view illustrating the state of arranging optical fibers by an optical fiber arranging unit in the case in which the optical fiber storage case of the optical fiber plate manufacturing apparatus using vibration according to the embodiment of the present invention is configured so as to be rotatable.

FIG. 4 is a view illustrating the process of supplying a bonding liquid by a bonding liquid supply unit in the case in which the optical fiber storage case of the optical fiber plate manufacturing apparatus using vibration according to the embodiment of the present invention is configured so as to be rotatable.

FIG. 5 is a view illustrating the process of manufacturing an optical fiber plate by cutting an optical fiber bundle manufactured by the optical fiber plate manufacturing apparatus using vibration according to the embodiment of the present invention.

FIG. 6 is a view illustrating the state in which an even surface layer is formed on the optical fiber plate manufactured by the optical fiber plate manufacturing apparatus using vibration according to the embodiment of the present invention.

DESCRIPTION OF REFERENCE NUMERALS

- 100: optical fiber plate manufacturing apparatus using vibration 110: optical fiber supply unit
- 111: supply roll 113: heating unit
- 115: supply forming roller 130: optical fiber cutting unit
- 150: optical fiber storage case 155: case rotating mechanism
- 170: optical fiber arranging unit 171: pressing mechanism
- 173: vibrating mechanism 190: bonding liquid supply unit
- 200: optical fiber plate 210: optical fiber
- 211: light entrance surface 213: light exit surface
- 230: even surface layer

BEST MODE

Reference will now be made in detail to the embodiments of the present invention, examples of which are illustrated in the accompanying drawings.

As illustrated in FIG. 1, an optical fiber plate manufacturing apparatus 100 according to an embodiment of the present invention may include an optical fiber supply unit 110.

The optical fiber supply unit 110 may supply an optical fiber 210 for manufacturing an optical fiber plate 200.

Specifically, the optical fiber supply unit 110 may include a supply roll 111 for the optical fiber 210.

The supply roll 111, around which the optical fiber 210 is wound, may unwind and supply the optical fiber 210 therefrom.

Here, the optical fiber 210 may not be a glass fiber, but may be a plastic optical fiber (POF) that is flexibly bendable.

The optical fiber supply unit 110 may include a heating unit 113.

The heating unit 113 may heat the optical fiber 210 wound around the supply roll 111 so that the optical fiber enters a movable state.

Here, since the optical fiber 210 wound around the supply roll 111 tends to remain in the wound shape as the time for which it remains wound increases, when the optical fiber 210 is unwound from the supply roll 111, the optical fiber 210 is in a curved bent state, rather than remaining straight. Therefore, the heating unit 113 may heat the optical fiber 210 so that the optical fiber can be straightened.

Specifically, the heating unit 113 may perform heating by an electric method, such as one using a hot wire. The heating unit 113 may heat the optical fiber 210 to a temperature at which plastic deformation is possible.

The optical fiber supply unit 110 may include a supply forming roller 115.

The supply forming roller 115 may supply the optical fiber 210 wound around the supply roll 111 to an optical fiber storage case 150.

Here, a pair of supply forming rollers 115 may be provided so as to be rotatably engaged with each other, and the optical fiber 210 may be caught between the pair of supply forming rollers 115. As such, when the supply forming rollers 115 are rotated, the optical fiber 210 caught between the supply forming rollers 115 may be forcibly unwound from the supply roll 111 and moved to the optical fiber storage case 150.

Specifically, the supply forming rollers 115 may be driven by an electric motor. In order to allow the optical fiber 210 to be supplied to the optical fiber storage case 150 after being heated by the heating unit 113, the supply forming rollers 115 may be located between the heating unit 113 and the optical fiber storage case 150.

Here, since the supply forming rollers 115 are configured to forcibly pull and supply the optical fiber 210 heated by the heating unit 113, the optical fiber 210, which has been made flexible by the heat of the heating unit 113, may be formed so as to be straight.

As illustrated in FIG. 1, the optical fiber plate manufacturing apparatus 100 using vibration according to the embodiment of the present invention may include an optical fiber cutting unit 130.

The optical fiber cutting unit 130 may cut the optical fiber 210 supplied via the optical fiber supply unit 110 to a preset length, and may supply cut optical fibers to the optical fiber storage case 150.

Specifically, the optical fiber cutting unit 130 may include a pair of cutter blades. When the optical fiber 210 passes between the pair of cutter blades by the preset length, the cutter blades mutually interact so as to vertically move, thereby cutting the optical fiber 210.

The optical fiber cutting unit 130 may be provided above a portion of the optical fiber storage case 150, into which the optical fiber 210 is supplied, so that the optical fiber 210 is cut when it has passed through the optical fiber cutting unit 130 by the preset length and so that the cut optical fibers 210 are immediately introduced into the optical fiber storage case 150.

As illustrated in FIGS. 1 and 2, the optical fiber plate manufacturing apparatus 100 using vibration according to the embodiment of the present invention may include the optical fiber storage case 150.

The optical fiber storage case 150 may store the optical fibers 210 cut by the optical fiber cutting unit 130.

Specifically, the optical fiber storage case 150 may be formed such that the width of the optical fiber storage case 150 is smaller than the length of the cut optical fibers 210, so as to allow the cut optical fibers 210 to be stored in a predetermined direction. The optical fiber storage case 150 may take the form of a rectangular box having an open top side.

In addition, the optical fiber storage case 150 may include a case rotating mechanism 155.

The case rotating mechanism 155 may rotate the optical fiber storage case 150 so that the optical fibers 210 are easily arranged therein.

Specifically, the case rotating mechanism 155 may rotate the optical fiber storage case 150 by an angle of 45 degrees so that any one side, among opposite sides of the lower end of the optical fiber storage case 150, which corresponds to the longitudinal direction of the optical fibers 210, is located at the lowermost position, and may then again rotate the rotated optical fiber storage case 150 to the initial state thereof.

Here, in the case in which the optical fiber storage case 150 is not rotated by the case rotating mechanism 155 and is located such that the bottom thereof is leveled, as illustrated in FIG. 2, the optical fibers 210 may be introduced into the optical fiber storage case 150 so as to be disposed between respective optical fibers 210 stored in advance so that the distance therebetween is minimized. On the other hand, when the optical fiber storage case 150 is rotated by the case rotating mechanism 155 so that the bottom thereof is pointed, as illustrated in FIG. 3, the optical fibers 210 may be introduced into the optical fiber storage case so as to be sequentially laminated from the bottom side, and therefore, may be arranged in a lattice form.

Here, in the case where the optical fibers 210 are arranged in the lattice form, as illustrated in FIG. 3, a more vivid image may be provided when the diameter of the optical fiber corresponds to the size of each pixel of a display panel to realize pixel matching. In the case in which pixel matching is difficult, as illustrated in FIG. 2, the optical fibers 210 may be arranged so that the distance therebetween is minimized in order to transmit as many images to be displayed on the display panel as possible so as to provide a vivid image.

The case rotating mechanism 155 may be configured to directly rotate the optical fiber storage case 150 using an electric motor, may be configured to rotate the optical fiber storage case by transmitting power of a drive motor through a power transmission member such as, for example, a belt, a chain, or a gear, or may be configured to rotate the optical fiber storage case using a cylinder.

Here, in the case in which the length of the cut optical fibers 210 is smaller than the length of the optical fiber storage case 150, the case rotating mechanism 155 may be configured to rotate the optical fiber storage case 150 in the forward direction or the rearward direction in which the optical fibers 210 are supplied, so as to allow the cut optical fibers 210 to be supported by and arranged on the sidewall of the optical fiber storage case 150, which is located in the direction in which the optical fibers 210 are supplied, or the sidewall located in an opposite direction.

Meanwhile, in the case in which the case rotating mechanism 155 rotates the optical fiber storage case so that the side of the optical fiber storage case corresponding to the longitudinal direction of the optical fibers 210 is lowered, the optical fiber storage case 150 may be rotated in the state in which only approximately half thereof is filled with the optical fibers 210, in order to prevent the optical fibers 210 from overflowing the sidewall.

In addition, in the case in which the optical fiber storage case 150 does not include the case rotating mechanism 155, in order to arrange the optical fibers 210 in the lattice form, the optical fiber storage case 150 may be formed to have a shape corresponding to the state in which it is rotated such that the lower end portion thereof is pointed.

As illustrated in FIGS. 1 and 3, the optical fiber plate manufacturing apparatus 100 using vibration according to the embodiment of the present invention may include an optical fiber arranging unit 170.

The optical fiber arranging unit 170 may arrange the optical fibers 210 such that the optical fibers 210 are stored in the optical fiber storage case 150 with a minimized empty space.

Specifically, the optical fiber arranging unit 170 may include a vibrating mechanism 173.

The vibrating mechanism 173 may vibrate the optical fibers 210 stored in the optical fiber storage case 150 so that the optical fibers 210 are arranged according to the shape or the weight thereof.

Specifically, the vibrating mechanism 173 may be provided on the optical fiber storage case 150 so as to vibrate the stored optical fibers 210 by vibrating the optical fiber storage case 150, or may vibrate the stored optical fibers 210 by vibrating a pressing mechanism 171, which will be described later.

Here, the vibrating mechanism 173 may be realized as various known types of vibrators.

In addition, the optical fiber arranging unit 170 may include the pressing mechanism 171.

The pressing mechanism 171 may press the optical fibers 210 stored in the optical fiber storage case 150 from the top side thereof, so as to prevent the optical fibers 210 from being separated from the optical fiber storage case 150 during arrangement of the optical fibers 210 and to allow the optical fibers 210 to be easily arranged.

The pressing mechanism 171 may be configured such that a pressing plate presses the optical fibers 210 using the actuating pressure of a cylinder.

Specifically, the vibrating mechanism 173 may be provided on the pressing mechanism 171 so that vibration is transmitted to the optical fibers 210 in the state in which the optical fibers 210 stored in the optical fiber storage case 150 have been pressed, so as to allow the optical fibers to be arranged according to the weight or the shape thereof.

Here, the pressing mechanism 171, as illustrated in FIG. 2, may be configured to press the optical fibers 210 only when the optical fibers 210 are arranged at the minimized distance therebetween.

As illustrated in FIGS. 1 and 4, the optical fiber plate manufacturing apparatus 100 using vibration according to the embodiment of the present invention may include a bonding liquid supply unit 190.

The bonding liquid supply unit 190 may supply a bonding liquid to the optical fiber storage case 150 so that the optical fibers 210 stored in the optical fiber storage case 150 are attached to each other.

Specifically, the bonding liquid may be an optical adhesive or a UV-curing resin. When the bonding liquid is a UV-curing resin, the bonding liquid supply unit 190 may include a UV lamp, which emits UV light.

The operations and effects of the respective components described above will be described below in conjunction with a method of manufacturing the optical fiber plate 200 according to the embodiment of the present invention.

As illustrated in FIG. 1, in the optical fiber plate manufacturing apparatus 100 using vibration according to the embodiment of the present invention, the heating unit 113 is provided between the supply roll 111 and the optical fiber storage case 150, and the supply forming rollers 115 are provided between the heating unit 113 and the optical fiber storage case 150 to supply the heated optical fiber 210 to the optical fiber storage case 150 and to pull and straighten the optical fiber 210.

The optical fiber cutting unit 130 is provided between the supply forming rollers 115 and the optical fiber storage case 150 to cut the optical fiber 210 supplied by the supply forming rollers 115 to a preset length, and the optical fiber arranging unit 170 is provided on the optical fiber storage case 150 to uniformly arrange the stored optical fibers 210.

In addition, in the case in which the optical fiber storage case 150 includes the case rotating mechanism 155, the case rotating mechanism 155 may be configured to rotate the optical fiber storage case such that one side of the lower end thereof corresponding to the longitudinal direction of the stored optical fibers 210 is located at the lowermost position.

In addition, the bonding liquid supply unit 190 is provided on the optical fiber storage case 150 to supply a bonding liquid to the arranged optical fibers 210.

In the optical fiber plate manufacturing apparatus 100 having the above-described configuration, first, the optical fiber 210 wound around the supply roll 111 is pulled by the supply forming rollers 115 and unwound from the supply roll 111, so as to be supplied to the optical fiber storage case 150 (see FIG. 1).

The optical fiber 210 unwound from the supply roll 111 is heated by the heating unit 113 to a temperature at which plastic deformation is possible, thereby being straightened by the supply forming rollers 115, prior to being supplied to the optical fiber storage case 150.

The optical fiber 210 to be supplied to the optical fiber storage case 150 is cut to a preset length by the optical fiber cutting unit 130, and the cut optical fibers are introduced into the optical fiber storage case 150. Once a portion of the optical fiber storage case 150 has been filled with the optical fibers 210, the optical fiber arranging unit 170 is operated to uniformly arrange the optical fibers 210 stored in the optical fiber storage case 150 (see FIG. 2).

Specifically, the vibrating mechanism 173 of the optical fiber arranging unit 170 vibrates the optical fibers 210 stored in the optical fiber storage case 150 so as to uniformly vibrate the optical fibers 210 according to the shape or the weight thereof. In addition, the pressing mechanism 171 presses the optical fibers 210 from the top side thereof so as to minimize the distance between the optical fibers 210. Thereby, it is possible to prevent separation of the optical fibers 210 from the optical fiber storage case 150 and to minimize the distance between the optical fibers 210.

In the case in which the optical fibers 210 are stored in the state in which the bottom of the optical fiber storage case 150 is leveled as described above, the optical fibers 210 may be arranged between respective optical fibers 210 stored in advance so that the distance therebetween is minimized, which enables transmission of a large amount of light.

The optical fiber arranging unit 170 may be configured such that one of the vibrating mechanism 173 and the pressing mechanism 171 is first operated and the other one is subsequently operated, or such that the two are operated simultaneously. Alternatively, the optical fiber arranging unit 170 may include one of the vibrating mechanism 173 and the pressing mechanism 171.

Here, the pressing mechanism 171, as illustrated in FIG. 2, may be provided or may be operated only when the optical fibers 210 are arranged so as to minimize the distance therebetween.

In the case in which the optical fiber storage case 150 includes the case rotating mechanism 155, in the state in which the case rotating mechanism 155 rotates the optical fiber storage case 150 such that any one side, among opposite sides of the lower end thereof, is located at the lowermost position, the optical fiber 210 is cut and the cut optical fibers are supplied to the optical fiber storage case. Then, the optical fibers 210 may be arranged via operation of the vibrating mechanism 173 (see FIG. 3).

Here, when the case rotating mechanism 155 rotates the optical fiber storage case 150, the optical fiber storage case 150 has an inverted triangular shape and stores the optical fibers 210 therein. Therefore, since the optical fibers 210 are sequentially laminated and arranged from the lower end portion when vibration is generated by the vibrating mechanism 173, the optical fibers 210 may be arranged in a lattice form to enable pixel matching.

In addition, in the case in which the optical fiber storage case 150 is rotatably configured, only a portion of the optical fiber storage case 150 may be filled with the optical fibers 210 so that the optical fibers 210 do not overflow the sidewall of the rotated optical fiber storage case.

Once the optical fibers 210 have been arranged by the optical fiber arranging unit 170, the bonding liquid supply unit 190 supplies a bonding liquid to the arranged optical fibers 210 so that the arranged optical fibers 210 are attached to each other.

Here, in the case in which the optical fiber storage case 150 is configured so as to be rotated by the case rotating mechanism 155, in the state in which the optical fiber storage case 150 is rotated at an angle of 45 degrees such that the lower end side thereof is located at the lowermost position, the bonding liquid is primarily supplied and cured. Then, in the state in which the rotated optical fiber storage case 150 is again rotated to the initial position, the remainder of the optical fiber storage case is filled with the optical fibers 210. Then, in the state in which the stored optical fibers 210 are arranged by the optical fiber arranging unit 170, the bonding liquid is secondarily supplied and cured, whereby the entire optical fiber storage case 150 may be filled with the optical fibers 210 (see FIG. 4).

Once the optical fibers 210 have been attached to each other by the bonding liquid supplied to the optical fiber storage case 150, the resultant bundle of the optical fibers 210 is taken from the optical fiber storage case 150 and is cut to a preset height or length, or a plurality of bundles of the cut optical fibers 210 are attached to each other, whereby the optical fiber plate 200 having a preset shape may be manufactured.

The optical fiber plate 200 may have a light exit surface 213, which serves as a rough diffuser surface by which incident light is diffused and discharged. The diffuser surface may be formed by polishing. Here, polishing may be performed by a dry mechanical method or a wet chemical method.

As illustrated in FIG. 6, an even surface layer 230 may be formed on the light exit surface 213 of the optical fiber plate 200. The even surface layer may be formed by applying a certain layer material onto the light exit surface 213, and the certain layer material may be an optical adhesive or a UV-curing resin.

The layer material may have the same index of refraction as the optical fiber 210 to uniformly refract the light diffused by the rough diffuser surface, in order to provide a vivid image.

Here, the polished light exit surface 213 and the even surface layer 230 formed on the light exit surface 213 may have a haze value ranging from 0.1% to 1%, or may have transmissivity ranging from 95% to 98%, like glass.

Here, the optical fiber 210 normally has a viewing angle of 120 degrees at the center of the light exit surface 213. When the light exit surface is polished or provided with the even surface layer 230, the viewing angle may increase to 180 degrees via diffusion of light.

In the optical fiber plate 200 manufactured as described above, one side surface thereof in the longitudinal direction of the optical fiber 210 serves as a light entrance surface 211, and the other side surface serves as the light exit surface 213 from which the light incident on the light entrance surface 211 is discharged. For example, when the optical fiber plate 200 is attached to a display panel, the surface thereof to be brought into contact with the display panel is the light entrance surface 211 and the opposite surface is the light exit surface 213, so that an image is displayed on the surface that protrudes from the surface of the display panel by the height of the optical fiber plate 200, which may give a three-dimensional effect to the image.

Accordingly, the optical fiber plate manufacturing apparatus 100 using vibration according to the embodiment of the present invention may easily manufacture the optical fiber plate 200, and may also manufacture the optical fiber plate 200 to exhibit uniform transmission of light over the entire area thereof by uniformly arranging the optical fibers 210 using vibration.

In addition, by polishing the optical fiber plate 200 or forming the even surface layer 230 thereon, it is possible to increase the viewing angle of an image to be discharged therefrom.

Although the embodiments of the present invention have been disclosed for illustrative purposes, those skilled in the art will appreciate that the scope of the present invention is not limited thereto, and various modifications, additions and substitutions are possible, without departing from the scope and spirit of the invention as disclosed in the accompanying claims.

INDUSTRIAL APPLICABILITY

The present invention may be used in various industrial fields such as optical fields, display device fields, and advertisement device fields.

The invention claimed is:

1. An optical fiber plate manufacturing apparatus using vibration, the apparatus comprising:
    an optical fiber supply unit configured to supply an optical fiber, wherein the optical fiber supply unit comprises:
        a supply roll configured to wind the optical fiber therearound and supply the optical fiber; and
        a heating unit configured to heat the optical fiber, wound around and supplied from the supply roll, so as to be straightened;
    an optical fiber cutting unit configured to cut the optical fiber, supplied from the optical fiber supply unit, to a preset size;
    an optical fiber storage case configured to collect and store optical fibers, cut to the preset size, in a predetermined direction; and
    an optical fiber arranging unit configured to arrange the optical fibers, stored in the optical fiber storage case, using vibration so as to minimize a gap between the optical fibers.

2. The apparatus according to claim 1, further comprising a supply forming roller configured to guide the optical fiber, heated by the heating unit, to the optical fiber cutting unit and to pull and straighten the optical fiber.

3. The apparatus according to claim 1, wherein the optical fiber arranging unit comprises a vibrating mechanism configured to vibrate and arrange the optical fibers stored in the optical fiber storage case, or a pressing mechanism configured to press and arrange the optical fibers stored in the optical fiber storage case.

4. The apparatus according to claim 1, wherein the optical fiber storage case has a rectangular box shape, and comprises a case rotating mechanism configured to rotate the optical fiber storage case such that one side, among opposite sides of a lower end thereof, corresponding to a longitudinal direction of the optical fibers stored in the optical fiber storage case is located at a lowermost position.

5. The apparatus according to claim 1, further comprising a bonding liquid supply unit configured to supply a bonding liquid to the optical fiber storage case so that the optical fibers stored in the optical fiber storage case are attached to each other.

6. An optical fiber plate manufacturing method comprising:
    supplying an optical fiber from a supply roll configured to wind the optical fiber therearound;
    heating the optical fiber which is wound around and supplied from the supply roll so that the optical fiber is straightened;
    cutting the straightened optical fiber to have a plurality of optical fibers, each optical fiber has a preset size;
    collecting and storing cut optical fibers in a predetermined direction in an optical fiber storage case;
    arranging the cut optical fibers, stored in the optical fiber storage case, by applying vibration to the cut optical fibers; and
    supplying a bonding liquid to the arranged optical fibers and curing the bonding liquid.

7. The method according to claim 6, wherein the arranging comprises arranging the optical fibers using vibration or by pressing the optical fibers.

8. The method according to claim 6, wherein the arranging comprises rotating the optical fiber storage case such that one side, among opposite sides of a lower end thereof, corresponding to a longitudinal direction of the optical fibers stored in the optical fiber storage case is located at a lowermost position in a state in which only a portion of the optical fiber storage case is filled with the optical fibers.

9. The method according to claim 8, wherein the supplying comprises:
    primarily supplying the bonding liquid so that the optical fibers, stored in the optical fiber storage case, are attached to each other, after the rotating;
    filling a remaining portion of the optical fiber storage case with the optical fibers by rotating the optical fiber storage case to an initial state thereof when the primarily supplied bonding liquid is cured; and secondarily supplying the bonding liquid so that the optical fibers, stored in the remaining portion of the optical fiber storage case, are attached to each other.

10. The method according to claim 6, further comprising, after the supplying, cutting the bonded optical fibers in the optical fiber storage case, or bonding a plurality of optical fibers to each other so as to form the optical fibers having a preset shape.

11. The method according to claim 6, further comprising, after the supplying, polishing a light exit surface of the optical fiber, or forming an even surface layer on the light exit surface, so as to diffuse and discharge light from the light exit surface.

\* \* \* \* \*